(12) United States Patent
Shih

(10) Patent No.: US 9,518,607 B2
(45) Date of Patent: Dec. 13, 2016

(54) DRAIN PROOF BEARING ASSEMBLY

(71) Applicant: John Wun-Chang Shih, Kaohsiung (TW)

(72) Inventor: John Wun-Chang Shih, Kaohsiung (TW)

(*) Notice: Subject to any disclaimer, the term of this patent is extended or adjusted under 35 U.S.C. 154(b) by 55 days.

(21) Appl. No.: 14/507,800

(22) Filed: Oct. 6, 2014

(65) Prior Publication Data
US 2016/0097426 A1    Apr. 7, 2016

(51) Int. Cl.
*F16C 33/74*    (2006.01)
*F16C 17/10*    (2006.01)

(52) U.S. Cl.
CPC ............ *F16C 33/74* (2013.01); *F16C 17/107* (2013.01)

(58) Field of Classification Search
CPC .......... F16C 17/107; F16C 17/02; F16C 33/74
See application file for complete search history.

(56) References Cited

U.S. PATENT DOCUMENTS

| | | | | |
|---|---|---|---|---|
| 5,938,343 A * | 8/1999 | Grantz | ................ | F16C 17/026 384/100 |
| 6,316,856 B1 * | 11/2001 | Kusaki | ................ | F16C 17/026 310/67 R |
| 7,521,830 B2 * | 4/2009 | Chen | ................ | F16C 33/103 310/90 |
| 8,123,475 B2 * | 2/2012 | Yang | ................ | F04D 25/062 415/220 |
| 2004/0264817 A1 * | 12/2004 | Satoji | ................ | F16C 17/026 384/100 |
| 2005/0069235 A1 * | 3/2005 | Shih | ................ | F04D 29/057 384/119 |
| 2007/0076992 A1 * | 4/2007 | Hong | ................ | F16C 17/107 384/119 |
| 2007/0098310 A1 * | 5/2007 | Hong | ................ | F16C 17/10 384/100 |
| 2007/0172159 A1 * | 7/2007 | Komori | ................ | F16C 17/026 384/100 |
| 2007/0257571 A1 * | 11/2007 | Hong | ................ | F04D 29/056 310/67 R |

* cited by examiner

*Primary Examiner* — Thomas R. Hannon

(57) ABSTRACT

A drain proof bearing assembly includes a seat; a cylindrical bearing being receivable in a hollow space of the seat; the bearing being formed with an axial hole; an upper opening of the axial hole of the bearing being formed with an annual recess for receiving a drain proof ring; a plurality of radial notches being formed radially on an upper surface of the bearing; an outer surface of the bearing being formed with a plurality of oil guiding trenches; by the notches, the oil guiding trenches being communicated to the annular recess; and a press plate having an inner hollow penetrating hole and receivable in the hollow spate of the seat. Thereby, the fluid is prevented from draining out along the path from the spindle to the press plate. This design is effective from various kinds of bearings, such as fluid dynamic bearings, or oil bearings, etc.

4 Claims, 3 Drawing Sheets

_US 9,518,607 B2_

DRAIN PROOF BEARING ASSEMBLY

FIELD OF THE INVENTION

The present invention relates to bearings; and in particular to a drain proof bearing assembly.

BACKGROUND OF THE INVENTION

In the prior art bearing structure, a bearing is received into a bearing seat and a spindle is received into an axial hole of the bearing. Buckles are used to prevent the spindle from falling out so as to form as a tightly sealed bearing structure.

However, in the prior art structure, if the bearing is used for a long time, it is possible that inner liquid will drain out from the bearing so as to destroy the drain proof effect so that the bearing cannot act well and thus for a long time, it is unused. The whole lifetime of the bearing is shortened.

The reason of drainage is mainly that the static seat has minor gaps with the rotating spindle when rotating in a very high speed. By the gaps, air is vented therefrom. Mainly the gaps are formed from paths between the drain proof press plate and the spindle. That is to say, when the spindle rotates, fluid will form with a very thin film along an outer surface of the spindle and moves upwards. For a long time, the liquid drain out from the paths.

In one prior art, the spindle is formed with an annular recess and a silicide ring encloses the recess for tightening the space between the spindle and an inner wall of a hole penetrating the bearing. However, for a long time, the thin film will pass through the silicide ring so as to drain out from above mentioned path between the drain proof press plate and the upper surface of the bearing.

SUMMARY OF THE INVENTION

Accordingly, the object of the present invention is to improve the above mentioned defects, and thus a drain proof bearing assembly is provided, in that by the design of the present invention, the fluid is prevented from draining out along the path from the outer surface of the spindle to the press plate. This design is effective from various kinds of bearings, such as fluid dynamic bearings, or oil bearings, etc.

To achieve above defect, the present invention provides a drain proof bearing assembly, comprising: a seat having an axially arranged hollow space; and an upper end thereof is opened; a cylindrical bearing being receivable in a hollow space of the seat; the bearing being formed with an axial hole axially penetrating therethrough for receiving a spindle; an upper opening of the axial hole of the bearing being formed with an annual recess for receiving a drain proof ring; a plurality of radial notches being formed radially on an upper surface of the bearing; an outer surface of the bearing being formed with a plurality of oil guiding trenches; an upper end of each oil guiding trench being communicated with one end of a respective notch and another end of the notch being communicated to the annular recess; thus, by the notches, the oil guiding trenches being communicated to the annular recess; a press plate having an inner hollow penetrating hole and receivable in the hollow space of the seat; wherein in installation, the bearing is received into the hollow space of the seat; then, the spindle is received into the axial hole of the bearing while the annual groove of the seat is at an upper side of the bearing; then the drain proof ring is fitted into the annular recess of the bearing so as to clamp the spindle tightly in the axial hole of the bearing 2 and finally the press plate is located at an upper side of the bearing and is received within the hollow space of the seat.

DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
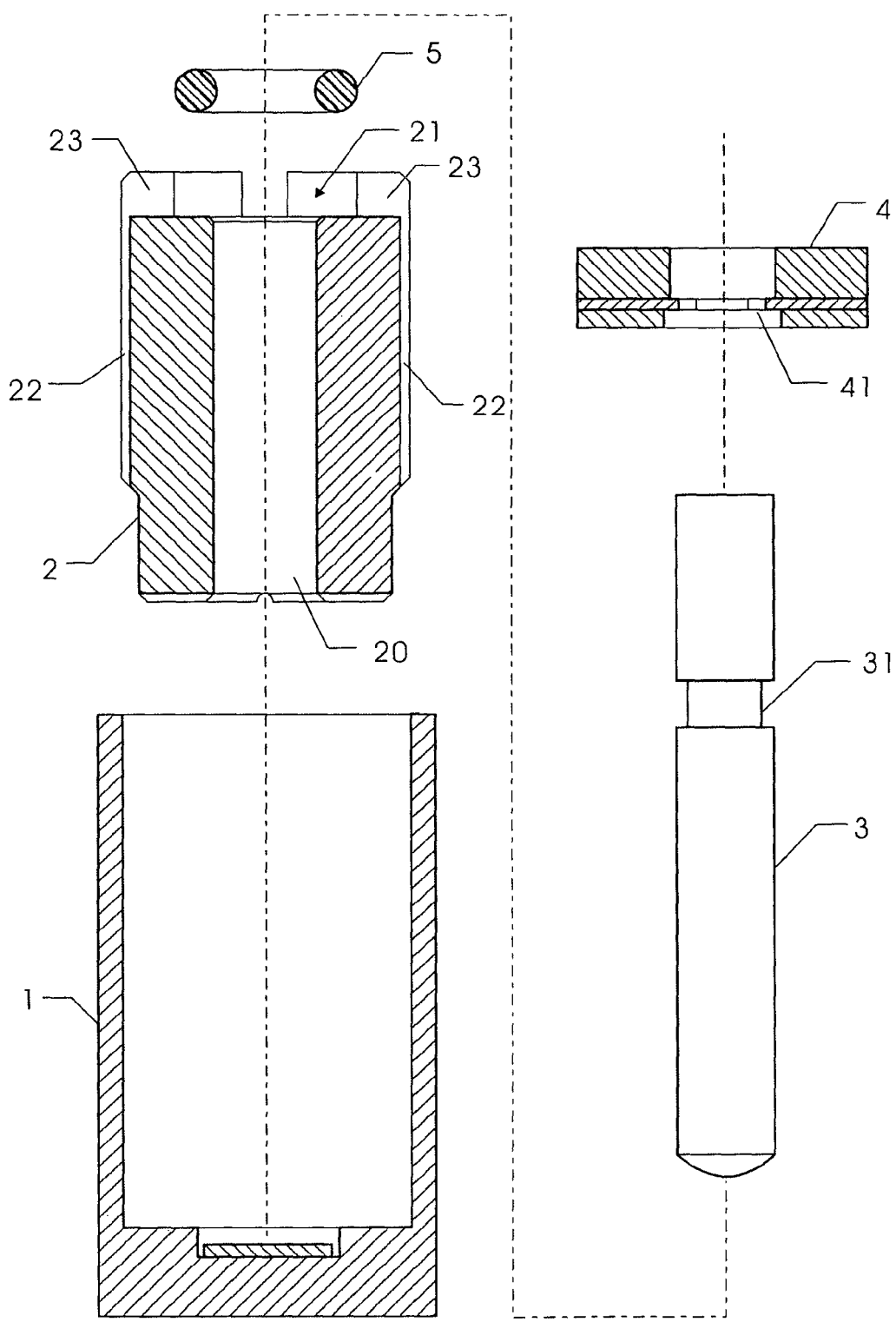
FIG. 1 shows the embodiment of the present invention.
Figure 3:
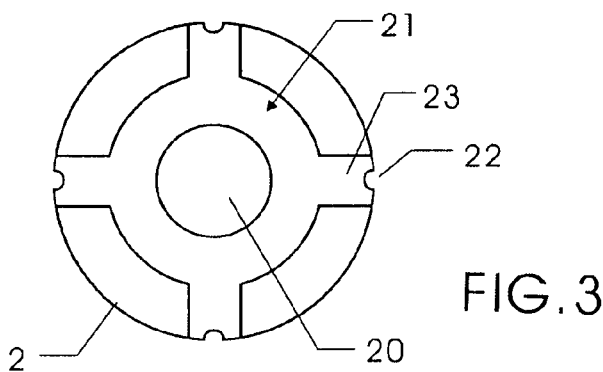
FIG. 3 is an upper side view of the bearing of the present invention.
Figure 2:
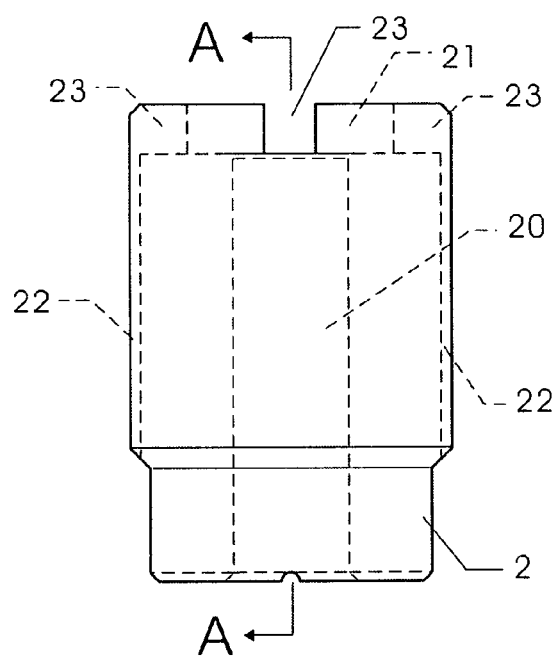
FIG. 2 shows the baring structure of the present invention according to the present invention.
Figure 5:
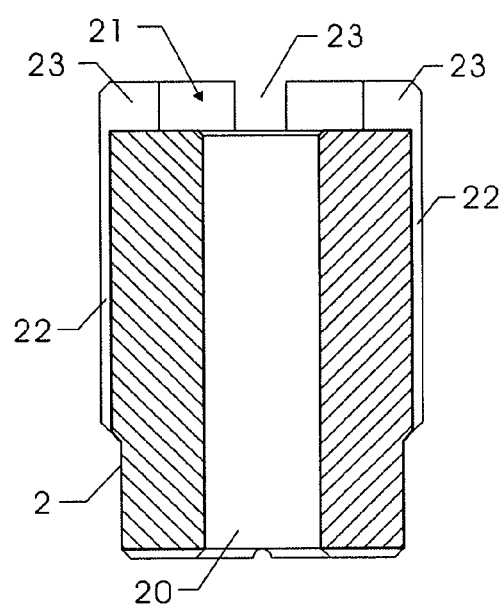
FIG. 5 is a cross sectional view along line A-A of the present invention.
Figure 4:
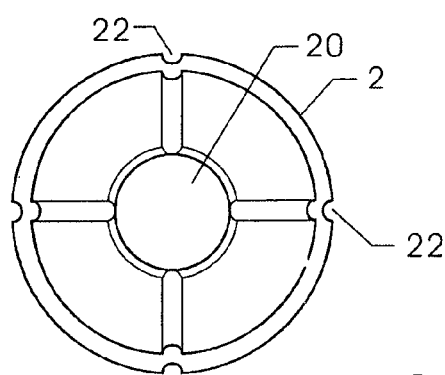
FIG. 4 is a lower side view of the bearing of the present invention.
Figure 6:
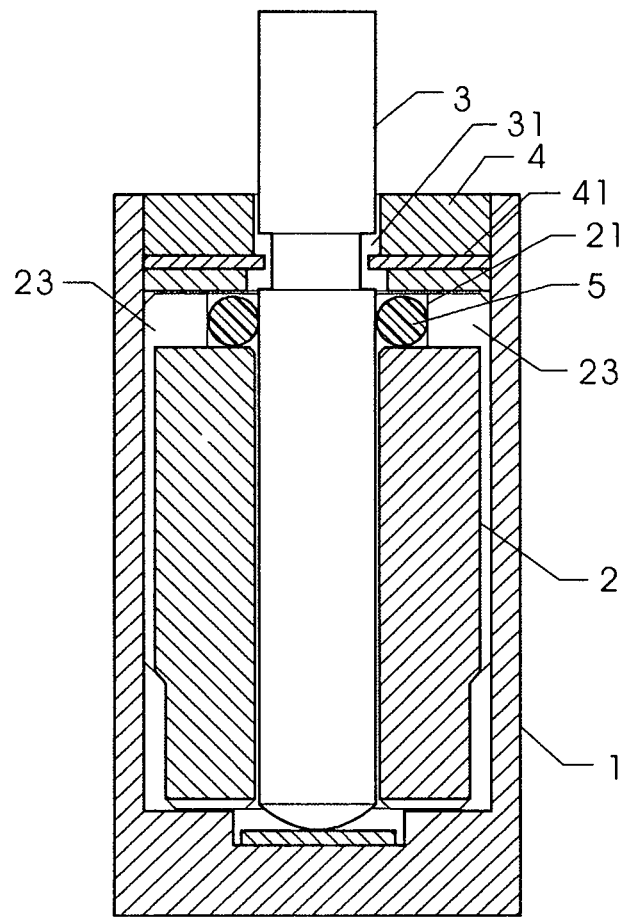
FIG. 6 is an assembly cross sectional view of the present invention.

With reference to FIGS. 1 to 6, the structure of the present invention is illustrated. The present invention includes the following elements:

A seat 1 has an axially arranged hollow space. An upper end thereof is opened.

A cylindrical bearing 2 is receivable in a hollow space of the seat 1. The bearing 2 is formed with an axial hole 20 axially penetrating therethrough for receiving a spindle 3.

An upper opening of the axial hole 20 of the bearing 2 is formed with an annual recess 21 for receiving a drain proof ring 5. A plurality of radial notches 23 are formed radially on an upper surface of the bearing 2. An outer surface of the bearing 2 is formed with a plurality of oil guiding trenches 22. An upper end of each oil guiding trench 22 is communicated with one end of a respective notch 23 and another end of the notch 23 is communicated to the annular recess 21. Thus, by the notches 23, the oil guiding trenches 22 are communicated to the annular recess 21.

A press plate 4 has an inner hollow penetrating hole and is receivable in the hollow space of the seat 1. At least one buckle 41 has one end inserted axially into the press plate 4 and another end thereof is protruded from an inner wall of the press plate 4. The buckle 41 is elastic. Furthermore, in the present invention, the buckle 4 may be integrally formed with the press plate 4.

In the present invention, a center portion of the spindle 3 is formed with an annular groove 31.

In installation, the bearing 2 is received into the hollow space of the seat 1. Then, the spindle 3 is received into the axial hole 20 of the bearing 2 while the annual groove 31 of the seat 1 is at an upper side of the bearing 2. Then the drain proof ring 5 is fitted into the annular recess 21 of the bearing 2 so as to clamp the spindle 3 tightly in the axial hole 21 of the bearing 2. Then the press plate 4 is located at an upper side of the bearing 2 and is received within the hollow space of the seat 1.

Since the buckle 1 is elastic so that the spindle 3 can pass through the buckles 41 to enter into the axial hole 20 of the bearing 2 to be located therein, while the buckles 41 are located in the annular groove 31 of the spindle 3 to fix the spindle 3 without fall out. The drain proof ring 5 installed within annual recess 21 has the effect of preventing fluid from flowing out along an outer surface of the spindle and the notches 23.

In the present invention, the bearing 2 may be one of various kinds of bearings, such as fluid dynamic bearings, or oil bearings, etc.

Therefore, by the design of the present invention, the fluid is prevented from draining out along the path from the outer surface of the spindle 3 to the press plate 4. This design is effective from various kinds of bearings, such as fluid dynamic bearings, or oil bearings, etc.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A drain proof bearing assembly comprising:
   a seat having an axially arranged hollow space; and an upper end thereof being opened;
   a cylindrical bearing being receivable in the hollow space of the seat; the bearing being formed with an axial hole axially penetrating therethrough for receiving a spindle;
   an upper side of the bearing near an upper opening of the axial hole of the bearing being formed with an annual recess for receiving a drain proof ring; a plurality of radial notches being formed radially on an upper surface of the bearing; an outer surface of the bearing being formed with a plurality of oil guiding trenches; an upper end of each oil guiding trench being communicated with one end of a respective notch and another end of the notch being communicated to the annular recess; thus, by the notches, the oil guiding trenches being communicated to the annular recess; and
   a press plate having an inner hollow penetrating hole and receivable in the hollow space of the seat;
   wherein in installation, the bearing is received into the hollow space of the seat; then, the spindle is received into the axial hole of the bearing while the annual groove of the seat is at an upper side of the bearing; then the drain proof ring is fitted into the annular recess of the bearing so as to clamp the spindle tightly in the axial hole of the bearing; and finally the press plate is located at an upper side of the bearing and is received within the hollow space of the seat.

2. The drain proof bearing assembly as claimed in claim 1, wherein at least one buckle has one end inserted axially into the press plate and another end thereof is protruded from an inner wall of the press plate; and the buckle is elastic; and
   wherein since the buckle is elastic so that the spindle can pass through the at least one buckle to enter into the axial hole of the bearing to be located therein, while the at least one buckle are located in an annular groove of the spindle to fix the spindle without fall out; the drain proof ring installed within the annual recess has the effect of preventing fluid from flowing out along an outer surface of the spindle and the notches.

3. The drain proof bearing assembly as claimed in claim 2, wherein the at least one buckle is integrally formed with the press plate.

4. The drain proof bearing assembly as claimed in claim 1, wherein the bearing is one of fluid dynamic bearings and oil bearings.

* * * * *